March 18, 1941.   A. BOYNTON   2,234,957

THREAD LOCKING MEANS

Filed Oct. 28, 1938

ALEXANDER BOYNTON,
INVENTOR,
BY Jesse R. Stone
Lester B. Clark
ATTORNEYS.

Patented Mar. 18, 1941

2,234,957

UNITED STATES PATENT OFFICE 2,234,957

THREAD LOCKING MEANS

Alexander Boynton, San Antonio, Tex.

Application October 28, 1938, Serial No. 237,525

7 Claims. (Cl. 285—146)

My invention relates to a method and means for securing pipe and pipe couplings together in a manner to prevent the pipe and couplings from galling or freezing together and becoming unscrewed.

An object of my invention is to provide a thread locking means to prevent tool joints and drill pipe couplings from becoming damaged in the threads or from becoming accidentally unscrewed while wells are being drilled or worked on by the rotatry method.

Another object is to prevent the rotary thrust during drilling operations from engaging or making up the threads so tightly that the drill pipe joints cannot later be unscrewed without damaging the pipe, coupling or tool joints.

A still further object is to provide a thread locking means that will hold the pipe and tool joints or couplings together even though the threads should be stripped and the locking means should be sheared.

Another object is to distribute the stresses more evenly than by placing all the stress on the threads, as is now done.
Instead of the expensive method of welding the tool joints and couplings to the drill pipe, as is now commonly done, to prevent accidental unscrewing of the drill pipe and galling or freezing the threads while in operation, I provide a special recess on each end of the couplings or tool joints, somewhat longer and wider than the usual recess, and scarify or cut grooves upon the inner surface of each recess and opposite surface of the drill pipe. I then fill each of these recesses with some tough, low-fusing metal or alloy which can be readily poured in or melted out of the recess on the job in the field.

I attain these and other objects, by construction illustrated in the accompanying drawing, in which—

Figure 1:
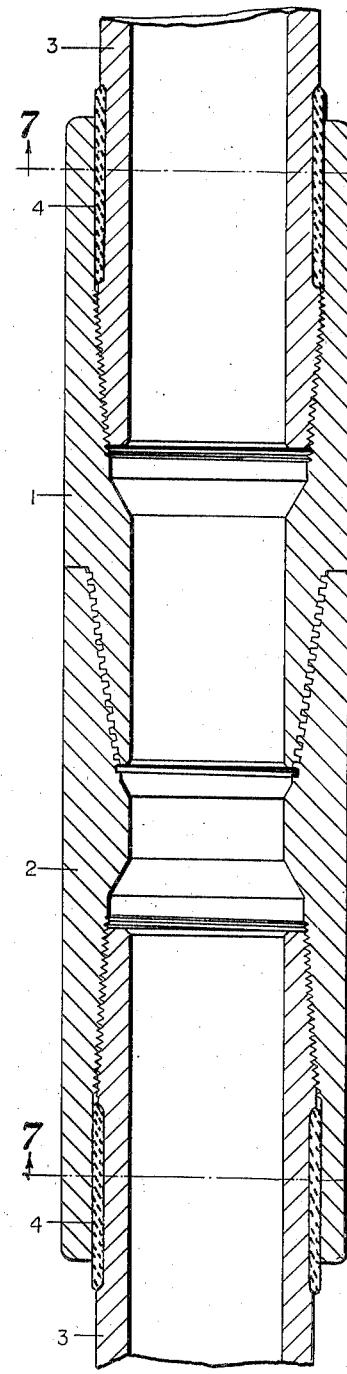
Fig. 1 is a longitudinal section of a tool joint and attached drill pipe showing the threads locked between the tool joints and drill pipe.
Figure 4:
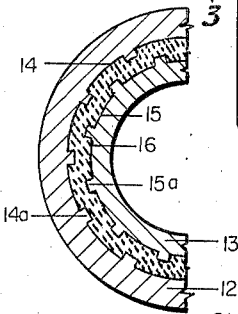
Figure 6:
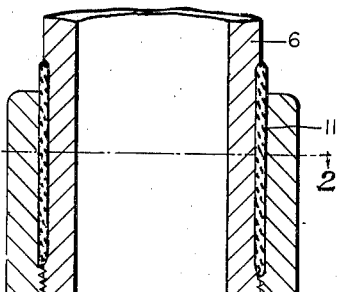

Fig. 4 illustrates a partial cross section of a modified form of thread lock taken in a position similar to sections 2—2 and 3—3 of Fig. 6 or sections 7—7 of Fig. 1.

Figure 5:
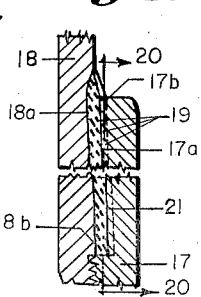
Figure 7:
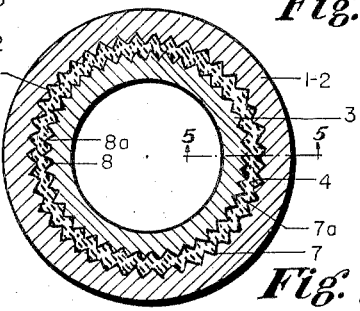

Fig. 5 is a partial longitudinal section through a modified form of thread lock similar to, but not identical with, the section 5—5, Fig. 7.
Fig. 6 is a longitudinal section of a drill pipe coupling and attached drill pipe showing the threads locked.

Fig. 7 is a cross section on lines 7—7, Fig. 1.

Similar characters refer to similar parts throughout the several views.

All threads in all the fingers are assumed to be right hand.

In Fig. 1, I have shown a tool joint pin or male member 1 and a box or female member 2 threadedly joined to upper and lower joints of drill pipe 3 with threads locked by babbitt, solder, type metal or other alloy having a lower fusing point than drill pipe, tool joints or drill pipe couplings, (hereinafter referred to as babbitt), poured, or otherwise placed, into the recess between the upper and lower ends of the tool joint and the drill pipe 3.

Fig. 7 shows that in sections 7—7, Fig. 1, the recesses in opposite ends of the tool joint have V-shaped lands or ridges 7a formed by and between V-shaped slots 7 opposed by V-shaped lands or ridges 8a formed by and between V-shaped slots 8 upon the drill pipe 3, the annular opening between each of these two serrated surfaces being poured or packed full of babbitt indicated at 4.

It will be observed that the drill pipe 3 cannot be unscrewed from either the pin end 1 or the box end 2 without completely shearing babbitt 4 by the lands 7a or 8a.

Fig. 6 illustrates a modified form of thread lock in which the drill pipe coupling 5, having threaded engagement with drill pipe joints 6 and 6A, are locked together from being unscrewed by babbitt 11. In order for the drill pipe 6 above the coupling 5 to become unscrewed in the well from the coupling, a left hand rotary force must be exerted upon the drill pipe above the coupling. It will be noted in Fig. 2, which shows the details at section 2—2, that the slots 10 form the spurs 10a in the drill pipe 6, and that these spurs face anti-clockwise, or in the direction which the drill pipe would be rotated in a well in order to unscrew it from coupling 5. It will be observed also that the slots 9 form the spurs 9a in the coupling 5, and that these spurs face clockwise, or in the direction which would offer greatest resistance to rotation of the babbitt 11 by an anti-clockwise thrust upon it imparted by spurs 10a of the drill pipe. It is, therefore, apparent that the drill pipe 6 cannot be unscrewed unless all of babbitt 11 be sheared through its central section or unless all the spurs 9a and 10a be sheared.

Figure 2:
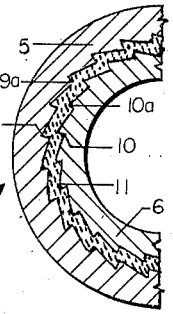
Fig. 2 is a partial cross section on the line 2—2, Fig. 6.
Figure 3:
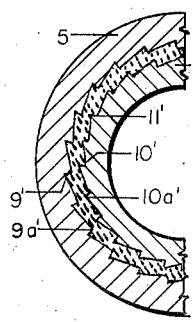
Fig. 3 is a partial cross section on the line 3—3, Fig. 6.

Fig. 3, which illustrates the details at section 3—3, Fig. 6, shows the slots and spurs facing in the opposite direction from those in Fig. 2. This is so, because, in a well, the unscrewing thrust upon lower drill pipe joint 6A would be exerted by the coupling 5. Therefore, the slots 9' in the lower end of the coupling are formed to cause the spurs 9a' to face anti-clockwise, so as to offer the greatest resistance to a left hand rotary thrust upon the coupling. Corollarily thereto, the slots 10' of the lower drill pipe joint 6A are formed to cause the spurs 10a' to face clockwise, or in the direction which would offer greatest resistance to rotation of the babbitt 11' by an anti-clockwise thrust upon it, imparted by coupling 5.

The slots and lands in Figs. 2 and 3 may be made exactly alike within both ends of the coupling 5 and upon both joints of drill pipe 6 and 6A. The reversal of direction in which the spurs face in Figs. 2 and 3 is accomplished by the reversal resulting from assembling the parts; this thrust being imparted by the drill pipe 6 in Fig. 2 and by coupling 5 in Fig. 3, as has been stated.

Fig. 4 is a cross section similar to sections 7—7, Fig. 1, illustrating another modified form of slots and lands from those shown in Figs. 2, 3, and 7. The coupling 12 has slots 14 forming lands 14a and drill pipe 13 has slots 15 forming lands 15a. It is apparent that rotation of coupling 12 or drill pipe 13 in either direction would be resisted by the total shearing force of babbitt 16 and by the total shearing force of all the lands 14a of the coupling and by the total shearing force of all the lands 15a of the drill pipe.

Fig. 5 is a partial vertical section through another modified form of thread lock. A cross section through this form would be similar to, and not perceptibly different from, the section 5—5, Fig. 7, for which reason said section is adopted as applicable to this construction also. The slots and lands of the pipe 18, forming the circular inclined surface indicated at 18a and the slots and lands of the tool joint or coupling 17, forming the circular inclined surface indicated at 17a form the annular chamber shown filled by babbitt 19. The opposing parallel surfaces 17a and 18a may be inclined or tapered outwardly, the larger diameter of such surfaces formed by the slots and lands being at the bottom of the annular chamber or opposite the place where the threads begin in the coupling and where the threads end on the pipe.

In this construction it is apparent that the drill pipe and coupling member would remain together if all the threads should be stripped and if all of the lands on both drill pipe and tool joint or coupling should be sheared and if the babbitt should be also sheared. While it is manifestly entirely improbable that all the lands and the babbitt should be sheared, such improbability does not alter the fact that the drill pipe and tool joint or coupling would still remain together, because, in whichever of said places the shearing should occur, the male member would be larger than the female member through which it would have to be withdrawn in order to accomplish separation. In this connection attention is directed to the fact that the lands of the drill pipe and slots forming the lands in the tool joint or coupling are adapted to register with each other, as appears in Fig. 7, and that the greatest over-all diameter of the lands on the drill pipe, indicated at 18b, is slightly less than the greatest inside diameter of the slots in the end of the tool joint or coupling, indicated at 17b.

In order to assemble the drill pipe and tool joint or coupling, as illustrated in Fig. 5, it is apparent that the drill pipe and tool joint or coupling are telescoped together until their respective lands or serrated surfaces are freed of engagement with each other by the parallel tapering of both serrated surfaces before the threads can be engaged. The length that the threads are then engaged and the angle of the sloping serrated surfaces forming the annular space filled by babbitt 19, manifestly determine the wall thickness of the central unserrated annular section of the babbitt, indicated at 21, Fig. 7. This wall thickness should be such that a line drawn parallel with the axis of the drill pipe from the outer edge of the drill pipe lands at the inner end thereof, such a point being indicated at 18b, Fig. 5, will pass diagonally through the babbitt and enter the serrated section of the tool joint or coupling, such point of exit from the central babbitt section 21 being preferably within the lower one-half of the babbitt, as indicated by the line 20—20, Fig. 5.

If the babbitt 19 should be sheared, the line of least resistance, of course, would be the shortest distance through it. A line parallel to the axis of the drill pipe would be this shortest distance; but since the line 20—20, representing this direction, passes out of the central babbitt section 21 and into the serrations of the tool joint or coupling, it is evident that the babbitt would be sheared along some plane within itself, i. e., within the section 21 which, for the reason stated, would result in the lower end of the male member being larger than the upper end of the female member; thus preventing them from becoming separated.

By merely increasing or decreasing the length of the recess or annular opening into which the babbitt is poured, and by correspondingly increasing or decreasing the length of the opposing slots and spurs or lands in the drill pipe, it is evident that the babbitt can be made to offer any desired resistance to the unscrewing or screwing in force, even to the extent of twisting off the pipe before the mating threads will move in either direction.

It is apparent that the thread locking means herein illustrated and described absorbs all of the rotary thrust of the pipe; thereby relieving the threads of this strain, and doing much to avoid pipe failures so often resulting from thread strain.

Those skilled in the art will know that slots and spurs or lands, like those herein shown, can be cheaply made with simple tools operable by unskilled labor in the field, and that babbitt or other tough, low-fusing metal or alloys can be poured into the recesses or melted out of them quickly at low cost and with no resulting damage to pipe, tool joints or couplings; thus making great improvement over the present practice of accomplishing the purposes herein stated by the expensive and damaging process of welding together the pipe, tool joints or couplings.

It is apparent that many different forms of slots, spurs or lands can be employed to accomplish the purposes hereof as disclosed by the stated objects and appended claims; and I reserve the right to make such changes and adaptations.

I claim:
1. A drill pipe joint including a tool joint member, a drill pipe threadably connected thereto, complementary grooves in said member and drill pipe to form an annular recess within the joint, lands within each of said grooves on each said member and said drill pipe, said lands extending longitudinally of the grooves, and a metal of low melting point cast within the recess and about the lands to form a lock between the tool joint member and the drill pipe whereby the joint member and drill pipe may be relatively rotated only after said metal is sheared.

2. A locked joint comprising two threadably connected sections, a groove about each of said sections adjacent the threads thereon to form a recess between the sections, complementary spurs extending longitudinally of the sections in said grooves, and a low melting point metal filling the recess and surrounding said spurs, said spurs having substantially radial faces so that the threaded connection can be altered only by shearing of the filler metal through its central section.

3. A locked joint comprising two threadably connected sections, longitudinal grooves in the surface of each of said sections adjacent the threads thereon, said grooves forming a recess having opposed lands with substantially radial faces, and a low melting point metal cast within said recess and surrounding said lands whereby the sections are locked against relative rotations.

4. A drill pipe joint comprising a tool joint member, a drill pipe section threadably connected thereto, grooves substantially longitudinally of each said member and section adjacent the threads thereon forming a recess therebetween outwardly tapering lands between the grooves on each member and section, said lands having their peripheral surfaces in closely juxtaposed relation, and a low melting point metal cast within the recess and about the lands.

5. A thread locking means comprising a male and a female member threadedly connected, an extension of said female member surrounding the male member proximate said threaded connection, an annular recess between said male member and said extension, lands and intervening slots in both said members opposite said recess, said lands and slots being longitudinal thereof, and a filler substance within said recess, said filler embracing said lands and filling said slots so as to lock said members together against rotation of either relative to the other except by shearing said lands or filler.

6. A thread locking means comprising a male and a female member threadedly connected, an extension of said female member surrounding the male member proximate said threaded connection, an annular recess between said male member and said extension, lands and intervening slots in both said members opposite said recess, said lands and slots being longitudinal thereof, and a metallic filler substance within said recess, said filler embracing said lands and filling said slots so as to lock said members together against rotation of either relative to the other except by shearing said lands or filler.

7. A thread locking means comprising a male and a female member threadedly connected, an extension of said female member surrounding the male member proximate said threaded connection, an annular recess between said male member and said extension, lands and intervening slots in both said members opposite said recess, said lands and slots being longitudinal thereof, a metallic filler substance having a lower melting point than either of said members within said recess, said filler embracing said lands and filling said slots so as to lock said members together against rotation of either relative to the other except by shearing said lands or filler.

ALEXANDER BOYNTON.